US009823943B2

(12) United States Patent
Mitsunobu et al.

(10) Patent No.: US 9,823,943 B2
(45) Date of Patent: Nov. 21, 2017

(54) APPARATUS AND METHOD FOR CONTROLLING VIRTUAL MACHINE MIGRATIONS BASED ON FLOW INFORMATION

(71) Applicant: FUJITSU LIMITED, Kawasaki-shi, Kanagawa (JP)

(72) Inventors: Hideki Mitsunobu, Kawasaki (JP); Toshihiko Kurita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 14 days.

(21) Appl. No.: 14/688,551

(22) Filed: Apr. 16, 2015

(65) Prior Publication Data

US 2015/0326658 A1 Nov. 12, 2015

(30) Foreign Application Priority Data

May 12, 2014 (JP) ................................ 2014-098872

(51) Int. Cl.
*G06F 9/455* (2006.01)
*H04L 29/08* (2006.01)
(Continued)

(52) U.S. Cl.
CPC ........ *G06F 9/45558* (2013.01); *G06F 9/4856* (2013.01); *G06F 9/5088* (2013.01);
(Continued)

(58) Field of Classification Search
None
See application file for complete search history.

(56) References Cited

U.S. PATENT DOCUMENTS

2005/0268298 A1 12/2005 Hunt et al.
2007/0169121 A1 7/2007 Hunt et al.
(Continued)

FOREIGN PATENT DOCUMENTS

| CN | 102082692 A | * | 6/2011 | ........... G06F 9/5088 |
| JP | 2005-327279 | | 11/2005 | |
| JP | 2012-226471 | | 11/2012 | |

OTHER PUBLICATIONS

Mohammad, Taha, and Chandra Sekhar Eati. "A Performance Study of VM Live Migration over the WAN." Apr. 2015. Blekinge Institute of Technology, MS thesis. <https://www.diva-portal.org/smash/get/diva2:828770/FULLTEXT01.pdf>.*

*Primary Examiner* — Anna Deng
*Assistant Examiner* — Binh Luu
(74) *Attorney, Agent, or Firm* — Staas & Halsey LLP

(57) ABSTRACT

An apparatus controls migration of a virtual machine between plural servers in a communication network. The apparatus acquires flow information by classifying, for each of virtual machines, pieces of data transmitted and received in each of the plural servers into flows having respective different destinations. The apparatus selects, based on the flow information, a migration target which is a virtual machine to be migrated from a first server whose number of virtual machines in operation is relatively large to a second server whose number of virtual machines in operation is relatively small, from among virtual machines in operation in the first server, by giving a higher priority to a virtual machine whose matching number of flows is larger, where the matching number of flows indicates a number of flows that are currently processed by both the virtual machine and the second server.

6 Claims, 15 Drawing Sheets

(51) Int. Cl.
*G06F 9/48* (2006.01)
*G06F 9/50* (2006.01)

(52) U.S. Cl.
CPC .. *H04L 67/1023* (2013.01); *G06F 2009/4557* (2013.01); *G06F 2009/45595* (2013.01)

(56) References Cited

U.S. PATENT DOCUMENTS

| | | | |
|---|---|---|---|
| 2010/0287548 A1* | 11/2010 | Zhou | G06F 9/4856 718/1 |
| 2011/0138381 A1* | 6/2011 | Hauser | G06F 9/4862 718/1 |
| 2012/0185856 A1* | 7/2012 | Ashihara | G06F 9/4856 718/1 |
| 2013/0151696 A1* | 6/2013 | Huang | G06F 11/3419 709/224 |
| 2013/0174157 A1* | 7/2013 | Elzur | H04L 41/0213 718/1 |
| 2014/0068608 A1* | 3/2014 | Kulkarni | G06F 9/45558 718/1 |
| 2014/0229944 A1* | 8/2014 | Wang | G06F 9/5088 718/1 |
| 2014/0280547 A1* | 9/2014 | DeCusatis | H04L 67/34 709/204 |
| 2015/0052517 A1* | 2/2015 | Raghu | G06F 9/4856 718/1 |
| 2015/0172183 A1* | 6/2015 | DeCusatis | H04L 12/4633 370/392 |

\* cited by examiner

FIG. 5

| SERVER NUMBER | VM NUMBER |
|---|---|
| Server1 | VM1 |
| Server1 | VM2 |
| Server1 | VM3 |
| Server2 | VM4 |
| Server2 | VM5 |
| Server3 | VM6 |

FIG. 6

| SERVER NUMBER | VM NUMBER | FLOW TYPE |
|---|---|---|
| Server1 | VM1 | Flow A |
| Server1 | VM1 | Flow B |
| Server1 | VM2 | Flow A |
| Server1 | VM2 | Flow C |
| Server1 | VM3 | Flow B |
| Server1 | VM3 | Flow C |
| Server2 | VM4 | Flow B |
| Server2 | VM4 | Flow C |
| Server2 | VM5 | Flow B |
| Server2 | VM5 | Flow C |
| Server3 | VM6 | Flow A |
| Server3 | VM6 | Flow C |

FIG. 7

| MIGRATION SOURCE SERVER | MIGRATION DESTINATION SERVER | MIGRATION CANDIDATE | MATCHING NUMBER |
|---|---|---|---|
| Server1 | Server3 | VM1 | 1 |
| Server1 | Server3 | VM2 | 2 |
| Server1 | Server3 | VM3 | 1 |

APPARATUS AND METHOD FOR CONTROLLING VIRTUAL MACHINE MIGRATIONS BASED ON FLOW INFORMATION

CROSS-REFERENCE TO RELATED APPLICATION

This application is based upon and claims the benefit of priority of the prior Japanese Patent Application No. 2014-098872, filed on May 12, 2014, the entire contents of which are incorporated herein by reference.

FIELD

The embodiments discussed herein are related to apparatus and method for controlling virtual machine migrations based on flow information.

BACKGROUND

In a data center, in some cases, a service is provided in which one or more virtual machines (VMs) are caused to operate in each of a plurality of servers included in the data center and a virtual machine is lent. For example, a service, such as software as a service (SaaS) and a virtual private server (VPS), is provided. Some service providers further provide a plurality of applications usable on a virtual machine. In this case, a user selects, from among the plurality of applications provided by a service provider, an application to be used by the user, and executes the application on the virtual machine. In accordance with a power usage state, server congestion, and the like, the service provider performs processes, such as arrangement of a new virtual machine and migration of an arranged virtual machine.

As related art, there has been proposed a method in which a communication queue of a virtual machine to be migrated is caused to reside in a shared memory shared by a migration destination and a migration source. In this method, an operating system (OS) and an application of the virtual machine to be migrated are copied to the shared memory, and then copied to the migration destination (for example, Japanese Laid-open Patent Publication No. 2005-327279). In addition, there has been proposed that communication data is stored in a common memory in a server in which a plurality of virtual operating systems (OSs) and a driver that manages communication processing are executed (for example, Japanese Laid-open Patent Publication No. 2012-226471).

SUMMARY

According to an aspect of the invention, an apparatus controls migration of a virtual machine between a plurality of servers in a communication network. The apparatus acquires flow information that is obtained by classifying, for each of virtual machines, pieces of data transmitted and received in each of the plurality of servers into flows having respective different destinations. The apparatus selects, based on the acquired flow information, a migration target which is a virtual machine to be migrated from a first server whose number of virtual machines in operation is relatively large among the plurality of servers to a second server whose number of virtual machines in operation is relatively small among the plurality of servers, from among virtual machines in operation in the first server, by giving a higher priority to a virtual machine whose matching number of flows is larger, where the matching number of flows indicates a number of flows that are currently processed by both the virtual machine as the migration target and the second server as a migration destination. The apparatus transmits a control packet for migrating the migration target to the second server.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a VM arrangement table, according to an embodiment;

FIG. 6 is a diagram illustrating an example of flow information, according to an embodiment;

FIG. 7 is a diagram illustrating an example of flow analysis data, according to an embodiment;

DESCRIPTION OF EMBODIMENTS

To operate and manage the data center, in some cases, the service provider, for example, collects a usage state of each application, and limits bandwidth usage for each user. In these processes, a process is performed for each of flows of transmitted and received packets. However, when a virtual machine is migrated for load balancing between servers, an imbalance in the number of virtual machines in operation between servers is resolved, for example, without consideration of the types of flows being processed by the virtual machines, and thus this may result in an arrangement that is not suitable for a process performed for each flow.

<Device Configuration>

Figure 1:
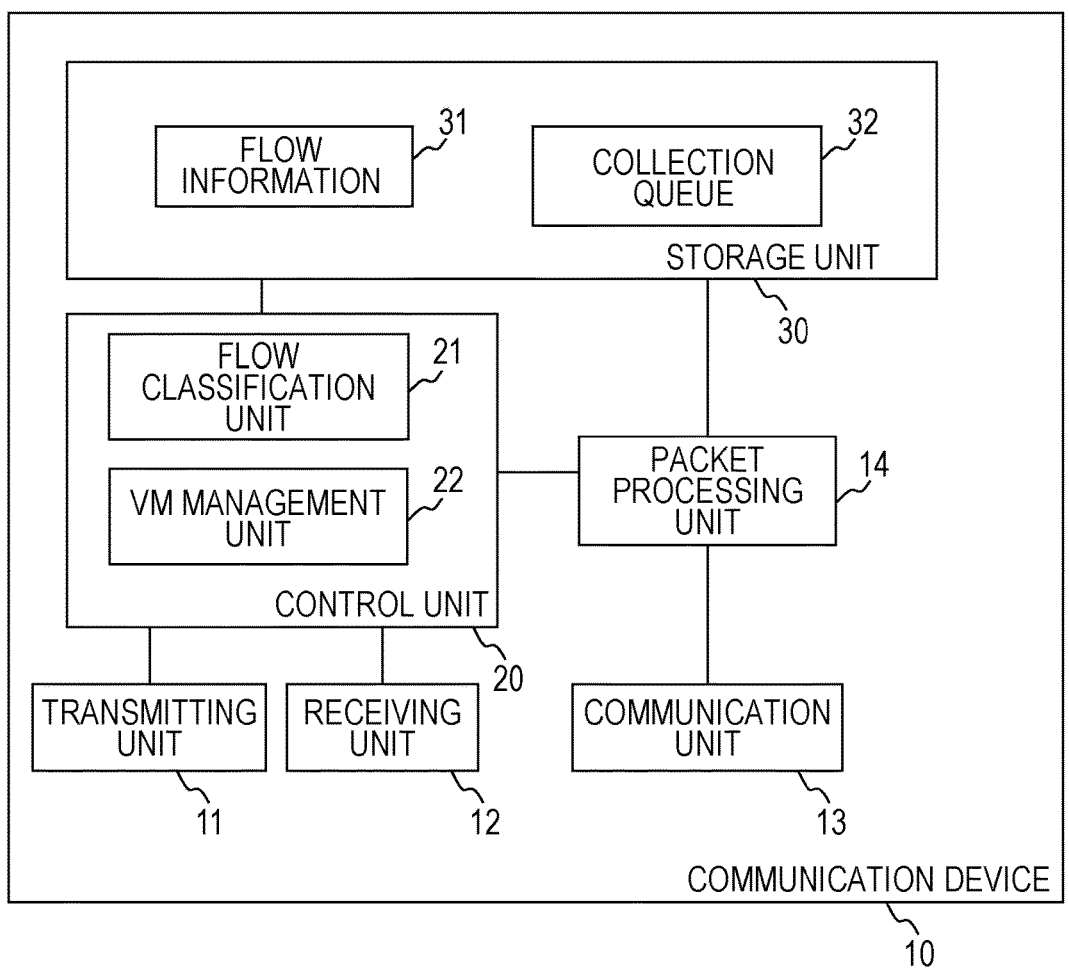
FIG. 1 is a diagram illustrating an example of a configuration of a communication device, according to an embodiment.

FIG. 1 is a diagram illustrating an example of a configuration of a communication device, according to an embodiment. The communication device 10 includes a transmitting unit 11, a receiving unit 12, a communication unit 13, a packet processing unit 14, a control unit 20, and a storage unit 30. The control unit 20 includes a flow classification unit 21 and a VM management unit 22. The storage unit 30 stores flow information 31 and a collection queue 32.

The transmitting unit 11 and the receiving unit 12 are used for communication between the communication device 10 and a control device (FIG. 2) that controls the communication device 10. The communication unit 13 is used for communication between the communication device 10 and another device included in a communication network. The packet processing unit 14 operates as a certain number of virtual machines, and processes a packet by using an application. In addition, in the case where the packet processing unit 14 operates as a plurality of virtual machines, the packet processing unit 14 also operates as virtual switches.

The flow classification unit 21 classifies, according to flow, packets transmitted and received by a virtual machine operating in the packet processing unit 14 through communication with another device included in the network. In the following examples, the flow classification unit 21 analyzes, as one flow, each combination of a destination address and a destination port number of a packet. In addition, the flow classification unit 21 may identify the type of an application used for packet processing by using information contained in a payload of a packet, and thereby may classify packets into a plurality of flows according to application.

The flow classification unit 21 stores classified results as the flow information 31 in the storage unit 30. Furthermore, the flow classification unit 21 stores packets of each flow in the collection queue 32 for each flow. The collection queue 32 includes queues different from flow to flow. The VM management unit 22 performs processes, such as initiation and termination of operation of, and migration of a virtual machine that operates in the packet processing unit 14. In other words, the VM management unit 22 operates as a migration processing unit that performs a process for migrating a virtual machine.

Figure 2:
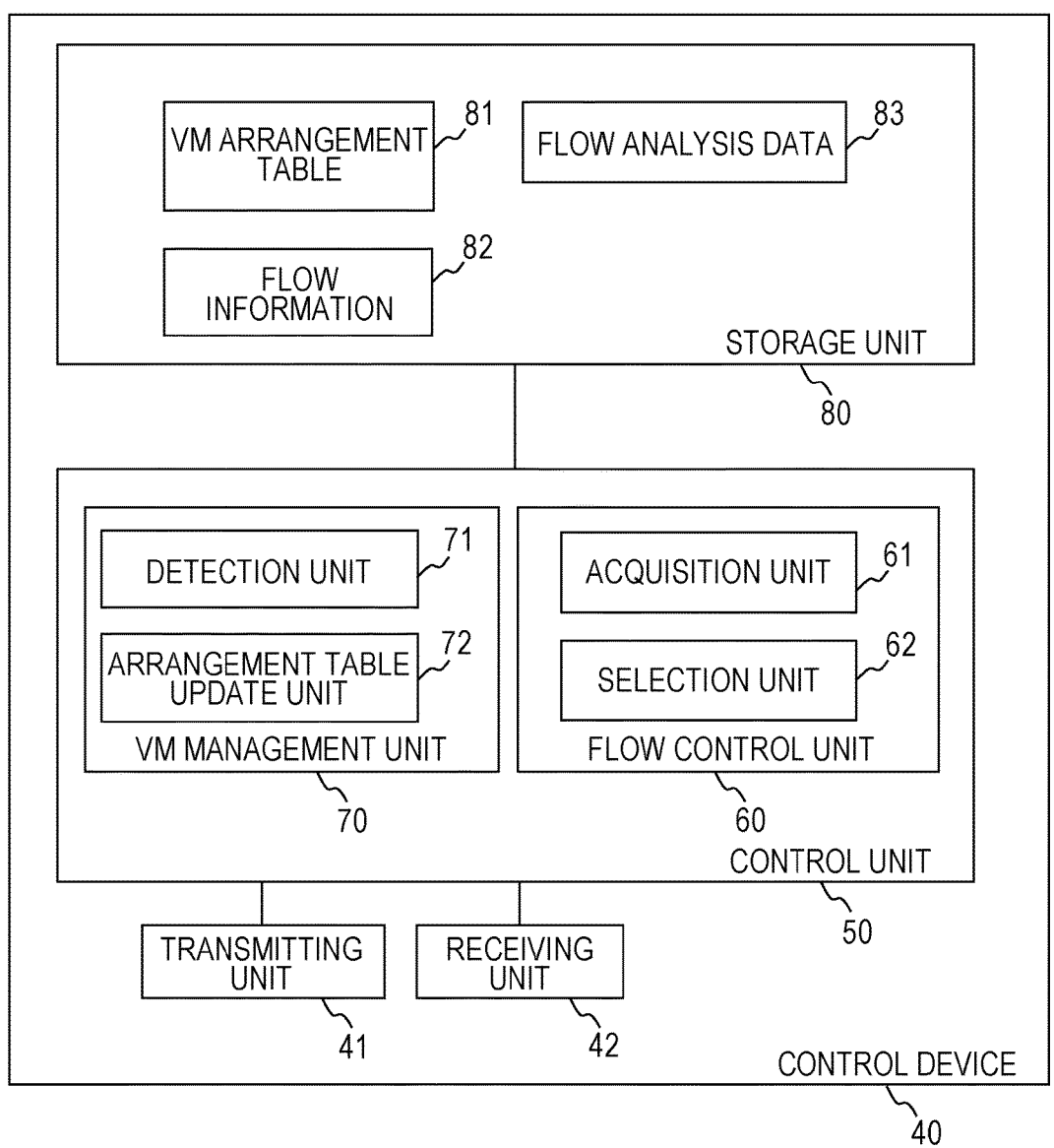
FIG. 2 is a diagram illustrating an example of a configuration of a control device, according to an embodiment.

FIG. 2 is a diagram illustrating an example of a configuration of a control device, according to an embodiment. The control device 40 includes a transmitting unit 41, a receiving unit 42, a control unit 50, and a storage unit 80. The control unit 50 includes a flow control unit 60, and a VM management unit 70. The flow control unit 60 includes an acquisition unit 61, and a selection unit 62. The VM management unit 70 includes a detection unit 71, and an arrangement table update unit 72. The storage unit 80 holds a VM arrangement table 81, flow information 82, and flow analysis data 83.

The transmitting unit 41 transmits a packet to the communication device 10. The receiving unit 42 receives a packet from the communication device 10. The receiving unit 42 outputs a packet for notification of information on a virtual machine operating in the communication device 10 to the arrangement table update unit 72, and outputs a packet for notification of information on the types of flows transmitted and received in the communication device 10 to the acquisition unit 61.

The acquisition unit 61 acquires, from the input packet, for each of the flows transmitted and received in the communication device 10 serving as a transmission source, identification information of a virtual machine processing a flow and identification information of the communication device 10 in which the virtual machine processing the flow is operating. The acquisition unit 61 stores the acquired information as the flow information 82 in the storage unit 80.

The arrangement table update unit 72 updates the VM arrangement table 81 by using the input packet. The VM arrangement table 81 is information in which the identification information of the communication device 10 is associated with identification information of a virtual machine in operation in the communication device 10. The detection unit 71 compares, by using the VM arrangement table 81, a plurality of communication devices 10 in terms of the number of virtual machines in operation. When a difference in the number of virtual machines in operation reaches a threshold value Th, the detection unit 71 makes a request to the selection unit 62 for selection of a virtual machine to be migrated and a migration destination of the virtual machine. At this time, the detection unit 71 notifies the selection unit 62 of a candidate for a communication device serving as a migration destination and a candidate for a communication device serving as a migration source.

The selection unit 62 compares, by using the information provided in the notification from the detection unit 71 and the flow information 82, flows being processed by a virtual machine operating in a communication device 10 serving as a migration source with flows being processed in a communication device 10 serving as a migration destination, and calculates the number of flows that match. The selection unit 62 stores an obtained result as the flow analysis data 83 in the storage unit 80, and selects, by using the flow analysis data 83, a virtual machine to be migrated and a migration destination of the virtual machine. The selection unit 62 notifies the arrangement table update unit 72 of selected results. The arrangement table update unit 72 generates a control packet for migrating the virtual machine, and transmits it to the communication device 10 in which the virtual machine serving as a migration target is operating and the communication device 10 serving as a migration destination of the virtual machine via the transmitting unit 41.

Figure 3:
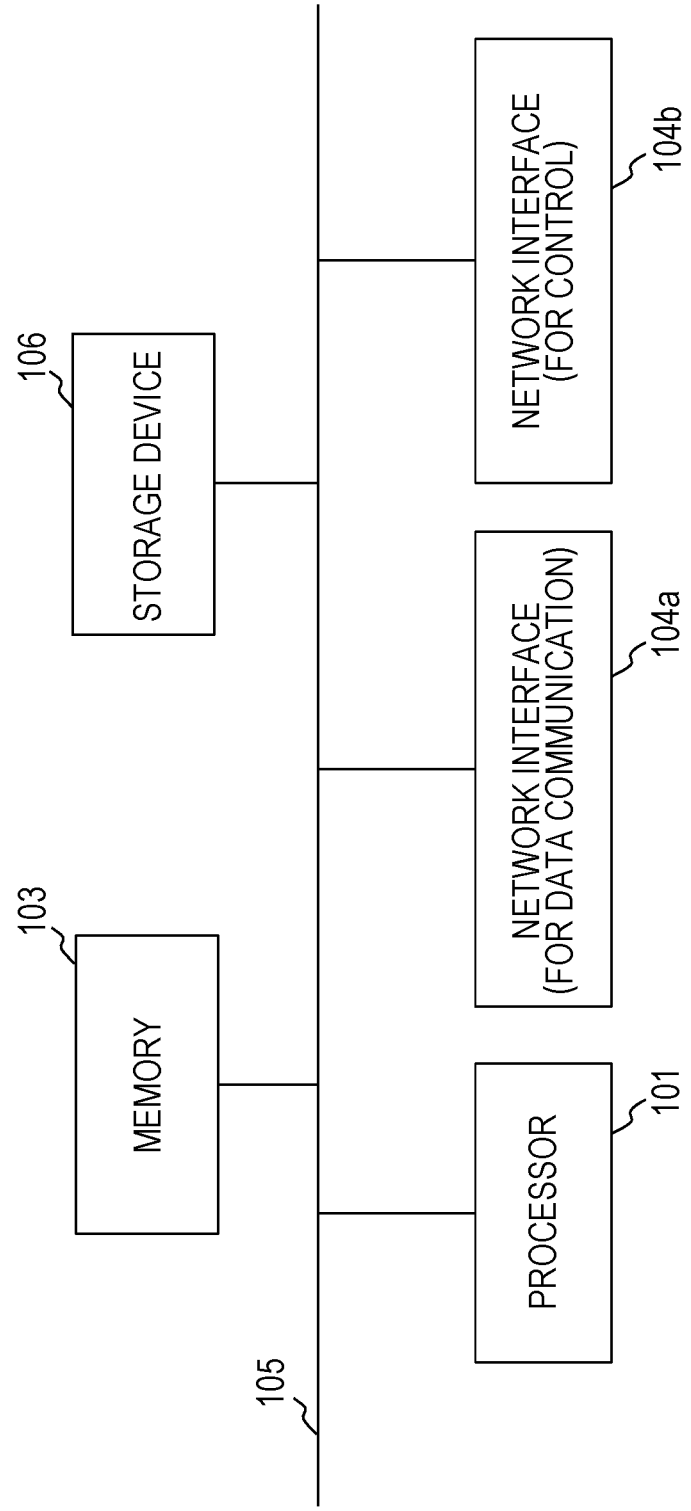
FIG. 3 is a diagram illustrating an example of a hardware configuration of a communication device and a control device, according to an embodiment.

FIG. 3 is a diagram illustrating an example of a hardware configuration of a communication device and a control device, according to an embodiment. Each of the communication device 10 and the control device 40 includes a processor 101, a memory 103, network interfaces 104, a bus 105, and a storage device 106. The communication device 10 and the control device 40 may each be implemented as a computer. The bus 105 connects the processor 101, the memory 103, the network interfaces 104 (104a, 104b), and the storage device 106 so as to enable mutual data transmission and reception. In addition, the processor 101 may execute a program stored in, for example, the storage device 106. When appropriate, the memory 103 stores data obtained by causing the processor 101 to operate and data used for a process performed by the processor 101 as well.

In the communication device 10, the processor 101 operates as the packet processing unit 14 and the control unit 20, and the memory 103 operates as the storage unit 30. In the communication device 10, a network interface 104a connected to a network for data communication operates as the communication unit 13. On the other hand, a network interface 104b is connected to a network for control, and therefore operates as the transmitting unit 11 and the receiving unit 12.

In the control device 40, the processor 101 operates as the control unit 50, and the memory 103 operates as the storage unit 80. In the control device 40, the transmitting unit 41 and the receiving unit 42 are implemented by the network interface 104b connected to the network for control, and the processor 101. In the control device 40, the network interface 104a is an option, and, in the case where the control device 40 does not perform user data transmission and reception, the control device 40 does not have to include the network interface 104a.

First Embodiment

Figure 4:
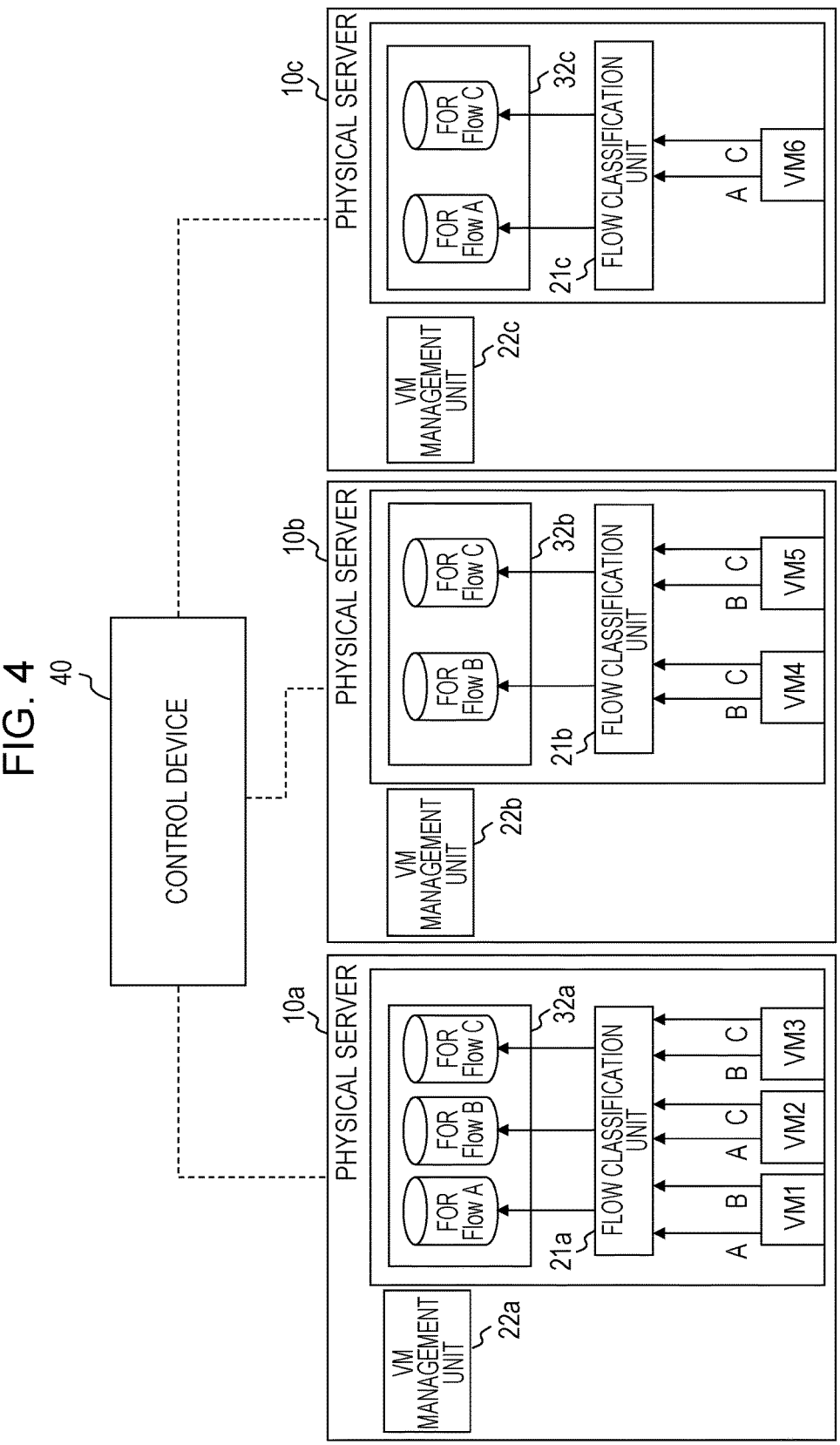
FIG. 4 is a diagram illustrating an example of a network, according to an embodiment.

FIG. 4 is a diagram illustrating an example of a network, according to an embodiment. As illustrated in FIG. 4, the case where communication devices 10a to 10c are connected to the control device 40 will be described below as an example. Dotted lines in FIG. 4 denote an example of a network for control used for communication between the communication devices 10a to 10c and the control device 40. In the example of FIG. 4, the communication devices 10a to 10c are each a physical server. Furthermore, in FIG. 4, lines for data transmission and reception are omitted so as to make FIG. 4 easily visible. In addition, in the following description, in order to easily distinguish which one of the communication devices 10 includes a unit performing an intended process, an alphabetical letter assigned to a communication device 10 in operation may be also added after a reference numeral of the unit. For example, a flow classification unit 21a is the flow classification unit 21 included in the communication device 10a.

At the time of initiation of operation of the network, it is assumed that the same number of virtual machines are operating in any of the communication devices 10a to 10c. Subsequently, after virtual machines whose operation has ended are subjected to a termination process, it is assumed that the virtual machines are arranged as illustrated in FIG. 4. Hereinafter, in order to distinguish between virtual machines, VM numbers will be used. A VM number is a character string in which a number for identifying each individual virtual machine is added after a character string "VM".

In the communication device 10a, virtual machines VM1 to VM3 are operating. The virtual machine VM1 is processing a flow A and a flow B. Furthermore, the virtual machine VM2 is processing a flow A and a flow C, and the virtual machine VM3 is processing a flow B and a flow C. The flow classification unit 21a outputs packets processed by the virtual machines VM1 to VM3 to a collection queue 32a for each flow. For this reason, a queue for flow A, a queue for flow B, and a queue for flow C are provided in the collection queue 32a.

In the communication device 10b, virtual machines VM4 and VM5 are operating. Both the virtual machines VM4 and VM5 are processing a flow B and a flow C. A flow classification unit 21b outputs packets processed by the virtual machines VM4 and VM5 to a collection queue 32b for each flow, and thus a queue for flow B and a queue for flow C are included in the collection queue 32b.

In the communication device 10c, a virtual machine VM6 is operating, and the virtual machine VM6 is processing a flow A and a flow C. A flow classification unit 21c outputs packets processed by the virtual machine VM6 to a collection queue 32c for each flow, and thus a queue for flow A and a queue for flow C are included in the collection queue 32c.

In the example of FIG. 4, although the case where the communication devices 10a to 10c are included in the network are illustrated, the number of communication devices 10 included in the network may be changed to any number in accordance with implementations. In addition, the number of and the types of flows processed by each virtual machine may be changed to any number and any types in accordance with implementations.

The VM management unit 22 of each communication device 10 transmits a packet for identifying a virtual machine operating in the communication device 10 to the control device 40 at specified time intervals. The receiving unit 42 of the control device 40 outputs the packet for identifying a virtual machine operating in the communication device 10 to the arrangement table update unit 72. Then, the arrangement table update unit 72 updates the VM arrangement table 81 by using the input packet.

FIG. 5 is a diagram illustrating an example of a VM arrangement table, according to an embodiment. In the VM arrangement table 81, for each virtual machine, identification information of a communication device 10 in which the virtual machine is operating is associated with identification information of the virtual machine. In the example of FIG. 5, server numbers are used as identification information of the communication devices 10, and VM numbers are used as identification information of the virtual machines. Here, a server number is assigned to each communication device 10 in advance and is a character string in which a number for identifying each individual communication device 10 is added after a character string "Server". In the example of FIG. 5, the server numbers assigned to the communication devices 10 are communication device 10a=Server1, communication device 10b=Server2, and communication device 10c=Server3. In the case where the virtual machines are arranged as illustrated in FIG. 4, the VM arrangement table 81 is as illustrated in FIG. 5.

The flow classification unit 21 of each communication device 10 transmits a packet (flow notification packet) for notification of the types of flows serving as processing targets in virtual machines operating in the communication device 10, to the control device 40 at specified time intervals. In the flow notification packet, a VM number of a virtual machine is associated with the type of a flow being processed by the virtual machine identified by the VM number. For example, a flow notification packet transmitted by the flow classification unit 21a contains the following information elements:
Destination Address: address of control device 40;
Source Address: address of communication device 10a;
VM Number: VM1;
Processing Target in VM1: flow A, flow B;
VM Number: VM2;
Processing Target in VM2: flow A, flow C;
VM Number: VM3; and
Processing Target in VM3: flow B, flow C.

The receiving unit 42 of the control device 40 outputs the flow notification packet to the acquisition unit 61. Then, the acquisition unit 61 updates the flow information 82 by using the input packet.

FIG. 6 is a diagram illustrating an example of flow information, according to an embodiment. The flow information 82 represents the flow types of flows being processed by virtual machines. In the flow information 82 as well, each virtual machine is represented by a combination of a server number and a VM number. FIG. 6 illustrates an example of the flow information 82 generated in the case where the virtual machines are arranged as illustrated in FIG. 4 and each virtual machine is processing flows of the types illustrated in FIG. 4.

In the control device 40, the VM arrangement table 81 and the flow information 82 are updated in association with a change in virtual machines operating in each communication device 10 included in the network and/or a change in flows processed by each virtual machine. That is, the detection unit 71 and the selection unit 62 may grasp current flow processing states and virtual machine operation states in the network by using the VM arrangement table 81 and the flow information 82.

The detection unit 71 identifies the number of virtual machines in operation in each communication device 10 by using the VM arrangement table 81. Furthermore, the detection unit 71 calculates a difference in the number of virtual machines in operation between a communication device in which the number of virtual machines in operation is a maximum and a communication device in which the number of virtual machines in operation is a minimum. For example, in the case where the VM arrangement table 81 is as illustrated in FIG. 5, the detection unit 71 identifies three virtual machines in operation in the communication device 10a, two virtual machines in operation in the communication device 10b, and one virtual machine in operation in the communication device 10c. In addition, the detection unit 71 determines that a difference in the number of virtual machines in operation between the communication device 10a in which the number of virtual machines in operation is a maximum and the communication device 10c in which the number of virtual machines in operation is a minimum is two.

The detection unit 71 holds a threshold value Th in advance. The threshold value Th is a minimum value of differences in the number of virtual machines in operation between communication devices in a situation in which an imbalance in processing load between the communication devices is not allowed. When a calculated value of a difference in the number of virtual machines in operation reaches the threshold value Th, the detection unit 71 determines that an imbalance in processing load between the communication devices 10 has exceeded permissible amount. In the following description, it is assumed that the threshold value Th is two. In this case, since a difference in the number of virtual machines in operation between the communication device 10a and the communication device 10c is two, the detection unit 71 determines that an imbalance in processing load between the communication device 10a and the communication device 10c has increased to such an extent that the imbalance is not allowed.

When the detection unit 71 detects that an imbalance in processing load between the communication devices has exceeded the permissible amount, the detection unit 71 notifies the selection unit 62 of a communication device in which the number of virtual machines in operation is a maximum and a communication device in which the number of virtual machines in operation is a minimum, and thereby makes a request for selection of a virtual machine to be migrated. In the case where there are a plurality of communication devices in which the number of virtual machines in operation is a maximum, the detection unit 71 notifies the selection unit 62 of all of the communication devices in which the number of virtual machines in operation is a maximum. Also, in the case where there are a plurality of communication devices in which the number of virtual machines in operation is a minimum, the detection unit 71 similarly notifies the selection unit 62 of all of the communication devices in which the number of virtual machines in operation is a minimum. At this time, the detection unit 71 also notifies the selection unit 62 of the number of virtual machines in operation in each of the communication devices provided in the notification to the selection unit 62. In the following description, in order to make this embodiment understandable, an example of the case where one communication device serving as a migration source and one communication device serving as a migration destination have been detected will be described. For example, in the case illustrated in FIGS. 4 to 6, the detection unit 71 notifies the selection unit 62 of the following information:

Communication Device serving as Migration Source: communication device 10a (Server1);
Number of VMs in operation in Communication Device serving as Migration Source: 3;
Communication Device serving as Migration Destination: communication device 10c (Server3); and
Number of VMs in operation in Communication Device serving as Migration Destination: 1.

Through this process, the selection unit 62 recognizes that it has received a request for selection of a virtual machine to be migrated to the communication device 10c from among the virtual machines in operation in the communication device 10a.

The selection unit 62 calculates the number of flows (hereinafter referred to as the matching number of flows) that match between flows being processed by each virtual machine operating in the communication device, which has been provided as a communication device serving as a migration source in the notification, and flows being processed in the communication device serving as a migration destination. At this time, the selection unit 62 uses the flow information 82 (FIG. 6) as appropriate. The selection unit 62 may store obtained results as the flow analysis data 83 in the storage unit 80.

FIG. 7 is a diagram illustrating an example of flow analysis data, according to an embodiment. In the flow analysis data 83, for each virtual machine serving as a migration candidate in which the matching number of flows has been checked, a communication device serving as a migration source (migration source server), a communication device serving as a migration destination (migration destination server), and the matching number of flows (flow-matching number) are recorded. FIG. 7 illustrates an example of the flow analysis data 83 generated by the selection unit 62 when the network is in the state illustrated in FIG. 4 and when a request for selection of a virtual machine to be migrated to the communication device 10c from among the virtual machines in operation in the communication device 10a is made. The virtual machine VM1 is processing the flow A and the flow B, whereas the communication device 10c serving as a migration destination is processing the flow A and the flow C. For this reason, the matching number of flows obtained in the virtual machine VM1 is one. The virtual machine VM2 is processing the flow A and the flow C, whereas the communication device 10c serving as a migration destination is also processing the flow A and the flow C, and thus the matching number of flows obtained in the virtual machine VM2 is two. Furthermore, the virtual machine VM3 is processing the flow B and the flow C, whereas the communication device 10c serving as a migration destination is processing the flow A and the flow C, and thus the matching number of flows obtained in the virtual machine VM3 is one.

As a result of migration of a virtual machine, in the case where processing of a flow that has not been processed in a communication device serving as a migration destination is initiated, in the communication device serving as a migration destination, a queue for processing the flow to be newly processed is provided in the collection queue 32. Furthermore, in the case where, for each flow, analysis of restriction on communication traffic, a state of an application being used, and the like is performed, sampling for each flow is performed in each communication device 10. For this reason, as a result of an increase in the number of flows serving as processing targets, the communication device 10 also changes, for example, a setting of sampling as appropriate. These processes may significantly increase a processing load in a communication device 10 serving as a migration destination. Because of this, in a situation in which a process for each flow is being performed, the smaller the number of flows to be newly processed in the communication device 10 serving as a migration destination due to migration of a virtual machine is, the more an increase in processing load in the communication device 10 serving as a migration destination is reduced.

Thus, the selection unit 62 determines, in accordance with the content of an entry in which the matching number of flows is largest in the flow analysis data 83, migration of a virtual machine, and notifies the arrangement table update unit 72 of a selected virtual machine together with a communication device serving as a migration destination. For example, in the case where the flow analysis data 83 is as illustrated in FIG. 7, the selection unit 62 selects the virtual machine VM2 as a virtual machine to be migrated. In addition, at this time, a migration source is the communication device 10a, and a migration destination is the communication device 10c. Thus, the selection unit 62 notifies the arrangement table update unit 72 of the following information:
Communication Device serving as Migration Source: communication device 10a (Server1);
VM serving as Migration Target: VM2; and
Communication Device serving as Migration Destination: communication device 10c (Server3).

The arrangement table update unit 72 generates a control packet for migrating the virtual machine VM2 from the communication device 10a to the communication device 10c, and transmits it to the communication device 10a via the transmitting unit 41. Any technique capable of implementing live migration may be applied to a format of the control packet and processes performed in the communication device 10a and the communication device 10c.

Figure 8:
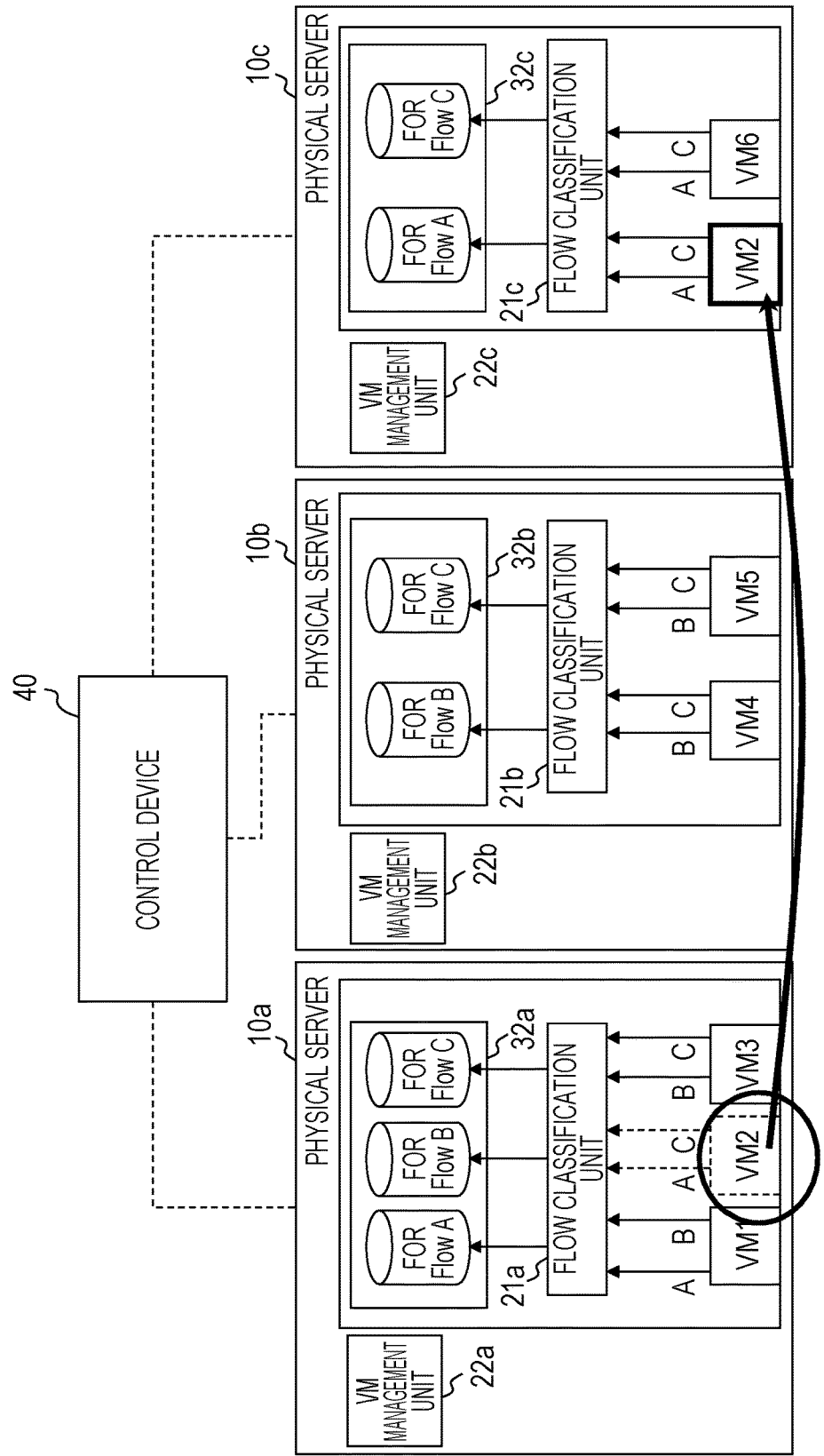
FIG. 8 is a diagram illustrating an example of migration of a virtual machine, according to an embodiment.

FIG. 8 is a diagram illustrating an example of migration of a virtual machine, according to an embodiment. FIG. 8 illustrates migration of the virtual machine VM2 in operation in the communication device 10a from the communication device 10a to the communication device 10c. Even when the virtual machine VM2 is migrated from the communication device 10a to the communication device 10c, the types of flows serving as processing targets are not changed in any of the communication devices 10. For this reason, when a method according to the first embodiment is used, an increase in processing load in a communication device 10 serving as a migration destination due to addition of a new flow serving as a processing target is likely to be avoided.

Figure 9:
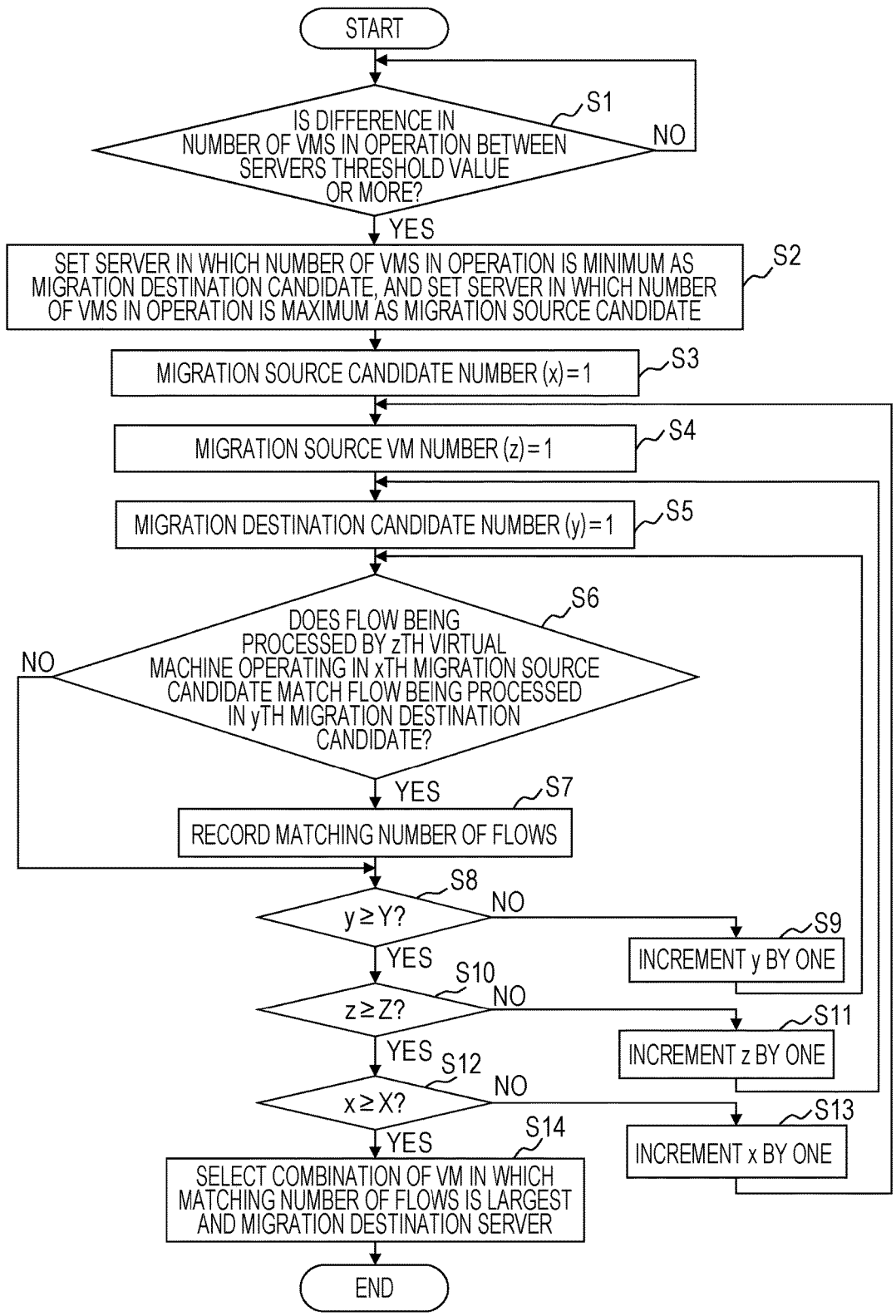
FIG. 9 is diagram illustrating an example of an operational flowchart for a process performed by a control device, according to an embodiment.

FIG. 9 is diagram illustrating an example of an operational flowchart for a process performed by a control device, according to an embodiment. The flowchart in FIG. 9 illustrates an example of a process for selecting a virtual machine to be migrated and a migration destination. In the flowchart in FIG. 9, variables x, y, and z, and constants X, Y, and Z are used. The variable x is used for count of communication devices (migration source candidates) that may serve as a migration source of a virtual machine. The variable y is used for count of communication devices (migration destination candidates) that may serve as a migration destination of the virtual machine. The variable z is used for count of virtual machines for which the matching number of flows has been identified. The constant X is the total number of the migration source candidates, the constant Y is the total number of the migration destination candidates, and the constant Z is the total number of virtual machines included in the migration source candidates. The constant Z is uniquely determined from the VM arrangement table 81 or the like in accordance with a server serving as a migration source candidate to be processed. FIG. 9 illustrates an example of the case where the communication devices 10 are servers.

The detection unit 71 determines whether or not a difference in the number of virtual machines in operation between the servers has become the threshold value Th or more (step S1). When a difference in the number of virtual machines in operation between the servers is less than the threshold value Th (No in step S1), the detection unit 71 waits. When a difference in the number of virtual machines in operation between the servers is the threshold value Th or more (Yes in step S1), the detection unit 71 sets a server in which the number of virtual machines in operation is a minimum as a migration destination candidate, and sets a server in which the number of virtual machines in operation is a maximum as a migration source candidate (step S2). The detection unit 71 notifies the selection unit 62 of the migration destination candidate and the migration source candidate. The selection unit 62 determines, by using the information provided from the detection unit 71, the constants X, Y, and Z, and also sets the variables x, y, and z at 1 (steps S3 to S5). The selection unit 62 determines whether or not there is, among flows being processed by a zth virtual machine operating in the server serving as an xth migration source candidate, a flow that matches a flow being processed in the server serving as a yth migration destination candidate (step S6). When there is a flow that matches a flow being processed in the server serving as the yth migration destination candidate (Yes in step S6), the selection unit 62 records, in the flow analysis data 83, the number of flows in the zth virtual machine that match a flow being processed in the communication device serving as the yth migration destination candidate (step S7). When a determination of No is made in step S6, or after the process of step S7, the selection unit 62 determines whether or not the variable y is the constant Y or more (step S8). When the variable y is less than the constant Y (No in step S8), the selection unit 62 increments the variable y by one, and then returns to step S6 (step S9). That is, in steps S6 to S9, in the case where there are two or more migration destination candidates, for each virtual machine in operation in the migration source candidate, the number of flows serving as processing targets that match a flow serving as a processing target in each of the migration destination candidates is calculated.

When the variable y is the constant Y or more (Yes in step S8), the selection unit 62 determines whether or not the variable z is the constant Z or more (step S10). When the variable z is less than the constant Z (No in step S10), the selection unit 62 increments the variable z by one, and then returns to step S5 (step S11). When the variable z is the constant Z or more, the selection unit 62 determines whether or not the variable x is the constant X or more (Yes in step S10, step S12). When the variable x is less than the constant X (No in step S12), the selection unit 62 increments the variable x by one, and then returns to step S4 (step S13). When the variable x is the constant X or more, the selection unit 62 refers to the flow analysis data 83, and selects, as a condition used for migration of a virtual machine, a combination of a virtual machine in which the matching number of flows is largest and a server serving as a migration destination (Yes in step S12, step S14). In other words, in step S14, the selection unit 62 selects a combination of a virtual machine in which the matching number of flows is largest and a server serving as a migration destination on a priority basis. The selection unit 62 selects, as a migration destination server, the server contained in the selected combination, and also selects, as a virtual machine to be migrated, the virtual machine contained in the selected combination.

Figure 10:
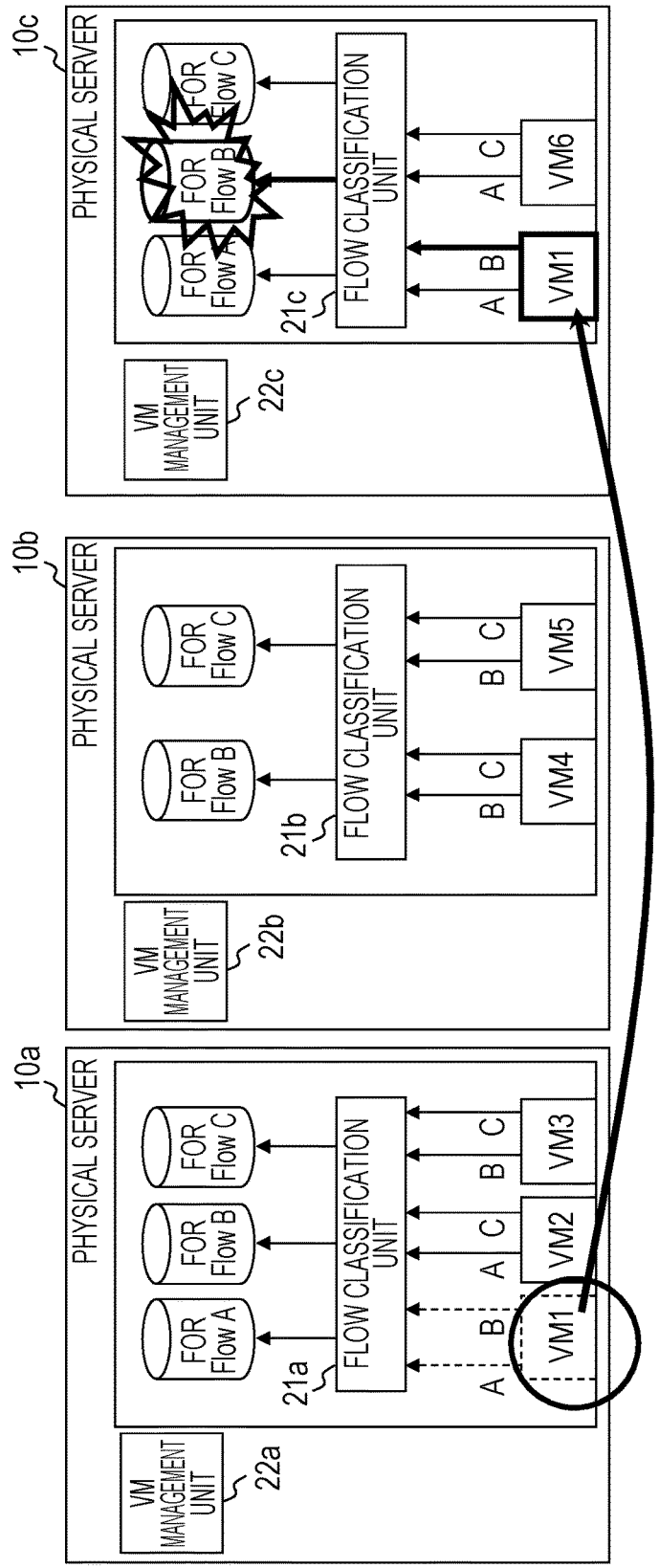
FIG. 10 is a diagram illustrating an example of a migration method that is to be avoided by using a method according to an embodiment.

FIG. 10 is a diagram illustrating an example of a migration method that is to be avoided by using a method according to the embodiment. When the number of virtual machines in operation in each communication device 10 is equalized without consideration of the type of a flow being processed by each virtual machine, the virtual machine VM1 is likely to be migrated from the communication device 10a to the communication device 10c as illustrated in FIG. 10. In this case, the virtual machine VM1 is processing the flow A and the flow B, whereas processing targets in the communication device 10c are the flow A and the flow C. For this reason, when the virtual machine VM1 is migrated to the communication device 10c, a queue to store a packet classified as the flow B is newly generated in the communication device 10c. Furthermore, with the addition of processes involved in the flow B, the communication device 10c also performs a process, such as a setting change of an interval of sampling from packets of each flow. Migration of a virtual machine using the method according to the first embodiment may keep a processing load in the communication device 10c serving as a migration destination from increasing due to an increase in the number of types of flows serving as processing targets in the migration destination of the virtual machine as illustrated in FIG. 10.

Figure 11:
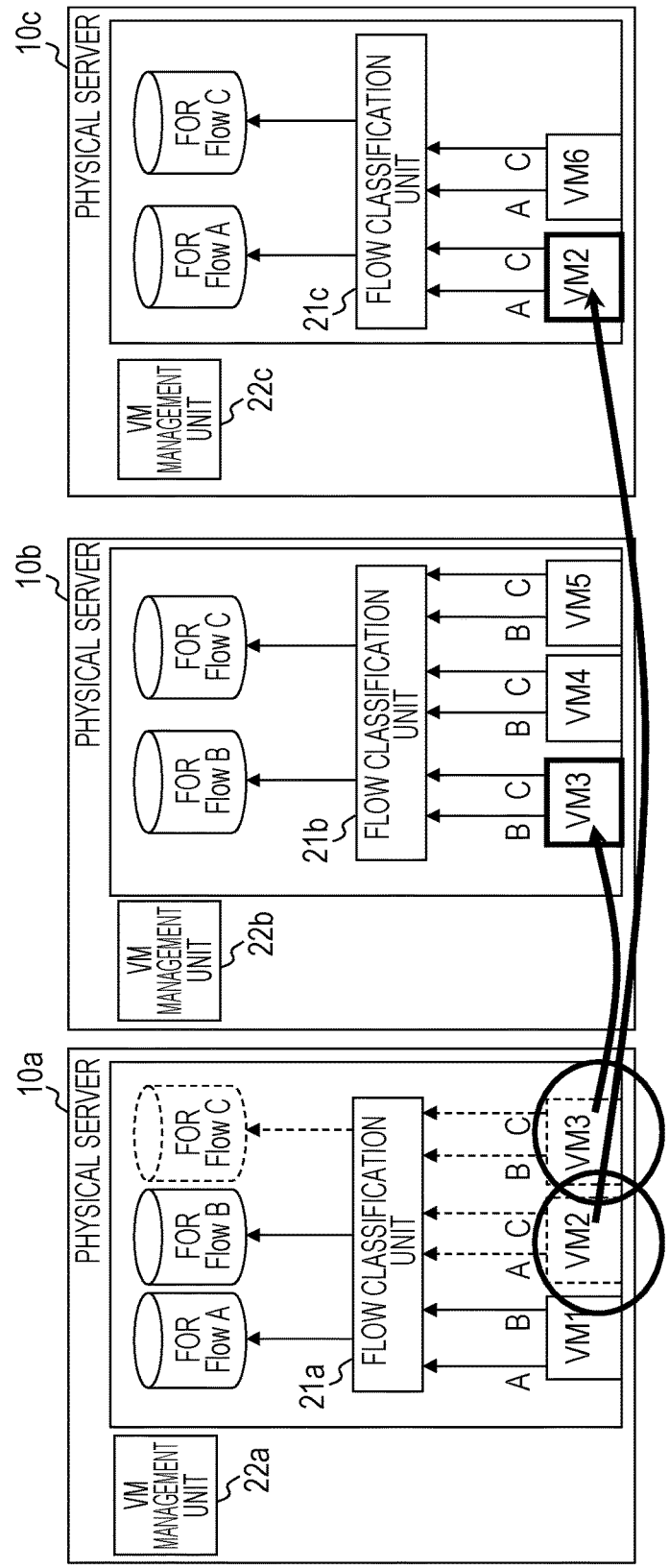
FIG. 11 is a diagram illustrating an example of a migration method that is to be avoided by using a method according to an embodiment.

FIG. 11 is a diagram illustrating an example of a migration method that is to be avoided by using a method according to an embodiment. FIG. 11 illustrates an example of the case where virtual machines are migrated so that the number of flows being processed in a communication device 10 is reduced without consideration of the number of virtual machines in operation in each communication device 10. Although the process illustrated in FIG. 11 resolves a problem in that an increase in the number of types of flows processed in one communication device 10 increases a processing load in the communication device 10, the process does not take into consideration the fact that a difference in the number of virtual machines in operation between communication devices 10 increases a difference in processing load between the communication devices 10. In this case, the virtual machine VM2 in operation in the communication device 10a is migrated to the communication device 10c, and the virtual machine VM3 in operation in the communication device 10a is also migrated to the communication device 10b. Such a process reduces the number of virtual machines that operate in the communication device 10a from three to one, and also reduces the number of types of flows that are processed from three to two; however, the number of virtual machines that operate in the communication device 10b becomes three. Because of this, even if virtual machines are migrated as illustrated in FIG. 11, a processing load in the communication device 10b is increased more significantly than that in the communication device 10a, and load balancing is unable to be performed.

On the other hand, migration of a virtual machine using the method according to the first embodiment may keep the number of types of flows serving as processing targets from increasing due to migration of the virtual machine, and also may perform load balancing between the communication devices 10.

Figure 12:
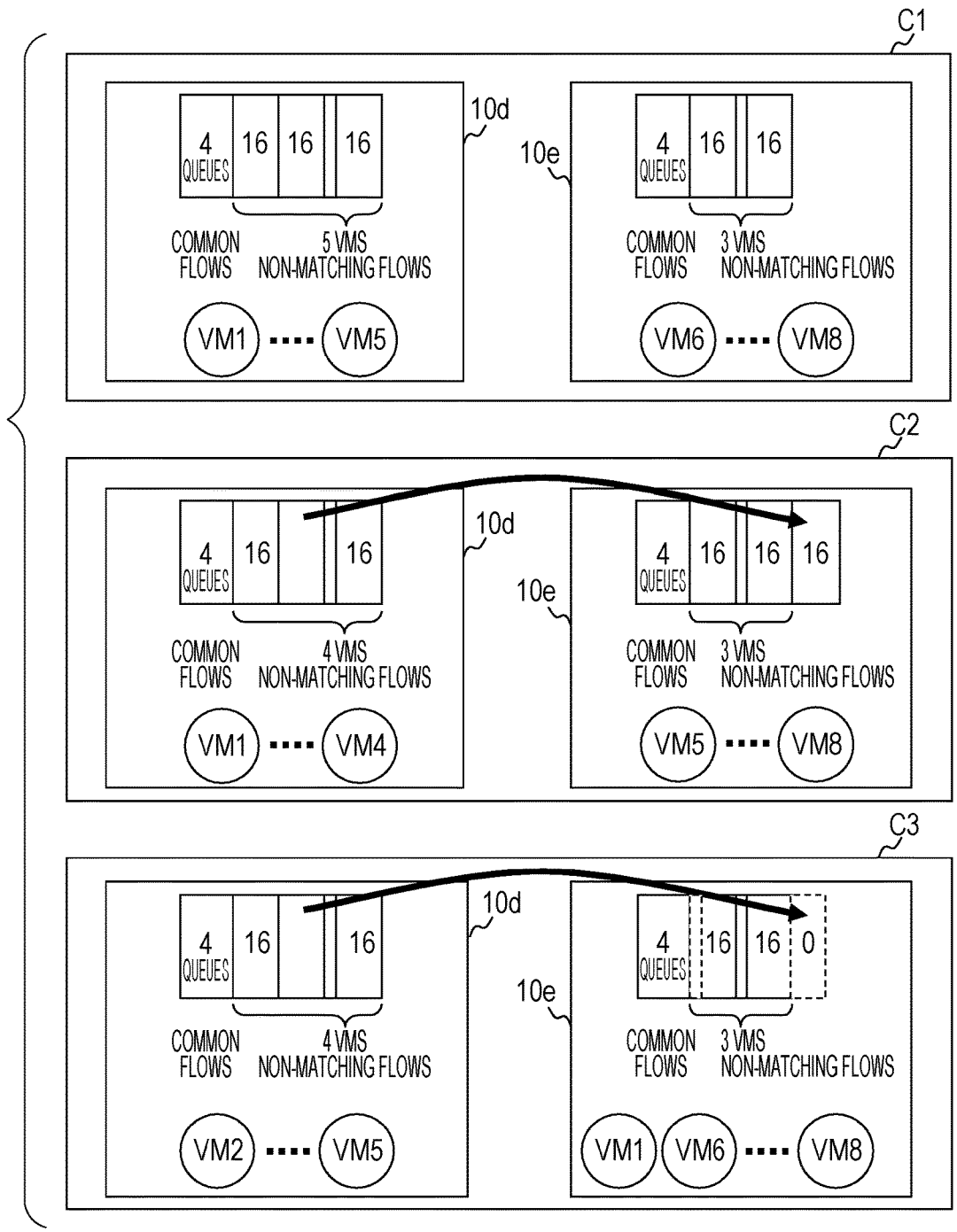
FIG. 12 is a diagram illustrating an example of a queue reduction performed by using a method according to a first embodiment.

FIG. 12 is a diagram illustrating an example of a queue reduction performed by using a method according to a first embodiment. Taking migration of a virtual machine in a data center as an example, a reduction in the number of queues according to the first embodiment will be described with reference to FIG. 12. Hereinafter, the average number of virtual machines installed is about four per communication device 10. Furthermore, in order to easily make a comparison, it is approximated that all of the virtual machines are the same in terms of an operating system used for operation of each virtual machine, the amount of memory usage, and a central processing unit (CPU) load. In each virtual machine, about 20 types of applications are used. Each application generates a flow specific to the application so as to transmit a packet to an application server that provides processing of the application.

A case C1 in FIG. 12 illustrates an example of an arrangement of virtual machines represented in the case where a process of migrating a virtual machine is performed. As illustrated in the case C1, five virtual machines VM1 to VM5 are operating in a communication device 10d serving as a migration source, and three virtual machines VM6 to VM8 are operating in a communication device 10e serving as a migration destination. Here, the probability that flows being processed match among the virtual machines VM1 to VM8 follows a Pareto distribution. That is, it is approximated that 20% of flows of applications match on average. Thus, in any of the virtual machines VM1 to VM8, among 20 types of flows, four flows are common flows. In the case C1, 16 types of flows in each of the virtual machines VM1 to VM5 are not common to other virtual machines. For this reason, in combination with four common flows of queues, 16×5+4=84 queues are installed in the communication device 10d. On the other hand, in the communication device 10e, 16 types of flows in each of the virtual machines VM6 to VM8 are not common to other virtual machines, and thus, in combination with four common flows of queues, 16×3+4=52 queues are installed.

Hereinafter, it is assumed that, among flows being processed by the virtual machine VM5, flows other than the four flows common to the virtual machines VM1 to VM8 do not match flows being processed in the communication device 10e. On the other hand, it is assumed that, among flows being processed by the virtual machine VM1, flows other than the four flows common to the virtual machines VM1 to VM8 are each a flow being processed by one of the virtual machines VM6 to VM8.

A case C2 illustrates the case where the virtual machine VM5 is migrated from the communication device 10d to the communication device 10e because a migration target has been randomly selected from among the virtual machines VM1 to VM5 operating in the communication device 10d. In this case, since the flows being processed by the virtual machine VM5 do not match flows in other virtual machines, except for the four flows, 16×4+4=68 queues are installed in the communication device 10e to which the virtual machine VM5 has been migrated.

A case C3 illustrates the case where the virtual machine VM1 is selected as a migration target because a virtual machine to be migrated has been selected by using the method according to the first embodiment. In this case, since, among the flows being processed by the virtual machine VM1, the flows other than the four common flows being processed by all the virtual machines also match flows in other virtual machines, the number of queues is not increased in the communication device 10e even when the virtual machine VM1 is migrated. In the communication device 10e to which the virtual machine VM1 has been migrated, 16×3+4=52 queues are installed. Hence, use of the method according to the first embodiment may reduce the number of queues by 16 queues in the case C3 as compared to the case C2.

Furthermore, it is assumed that, for processing of one queue, two types of applications for analysis of a transmission packet, two types of applications for analysis of a reception packet, and one type of application for recording of a log run are running, and a difference in processing load between the cases C2 and C3 is calculated. In the case C2, 68 queues are installed when the virtual machine VM5 is migrated to the communication device 10e, and thus, for processing of all the queues, 68×5=340 applications run. In addition, in any of the virtual machines VM5 to VM8, 20 types of applications are also running for processing other than the processing of queues. For this reason, the communication device 10e in the case C2 performs processing to such an extent that 340+20×4=420 types of applications are running.

On the other hand, in the case C3, 52 queues are installed when the virtual machine VM1 is migrated to the communication device 10e, and thus, for processing of all the queues, 52×5=260 applications run. In addition, in any of the virtual machines VM1, and VM6 to VM8, 20 types of applications are also running for processing other than the processing of queues. For this reason, processing performed in the communication device 10e in the case C3 involves processing for only 260+20×4=340 types of applications. Hence, the amount of processing performed in the communication device 10e in the case C3 is reduced to about 260/340×100≈76(%) as compared to the case C2.

Second Embodiment

In a second embodiment, the case where the process performed by the control device 40 in the first embodiment is performed by a flow control device 65 and a VM management device 75 will be described.

Figure 13:
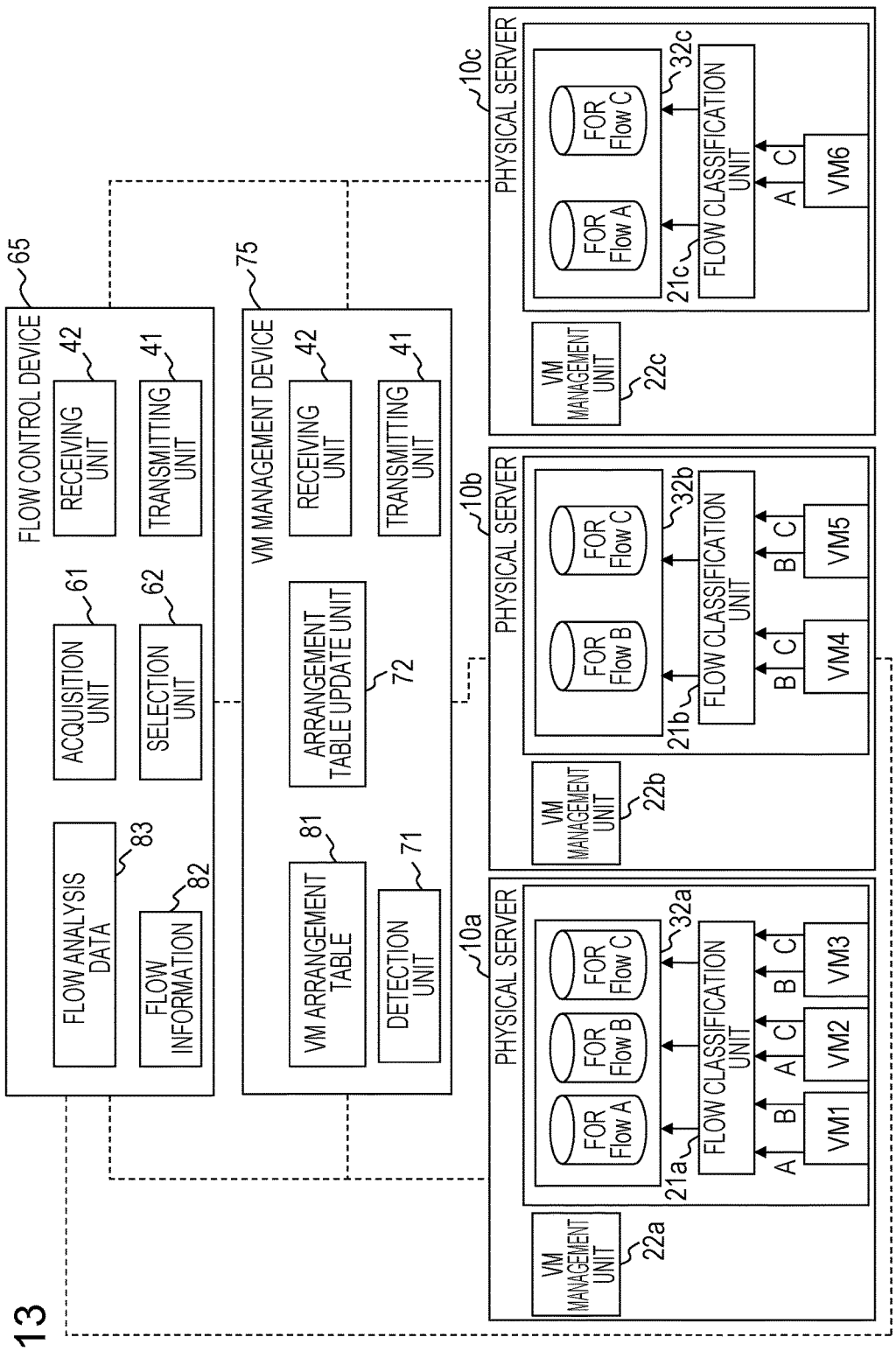
FIG. 13 is a diagram illustrating an example of a network, according to a second embodiment.

FIG. 13 is a diagram illustrating an example of a network, according to a second embodiment. The flow control device 65 and the VM management device 75 are each connected to communication devices 10a to 10c operating in the network. Also, the flow control device 65 and the VM management device 75 are connected to each other. Furthermore, FIG. 13 illustrates an example of the case where communication devices 10 operating in the network are the communication devices 10a to 10c, and an arrangement of virtual machines in the communication devices 10a to 10c and flows processed by each virtual machine are as described above with reference to FIG. 4. In addition, FIG. 13 merely illustrates an example, and, for example, the number of communication devices 10 included in the network, the number of virtual machines that operate in each communication device 10, and the types of flows processed may be changed to any number and any types in accordance with implementations.

The VM management device 75 includes a detection unit 71, an arrangement table update unit 72, a VM arrangement table 81, a transmitting unit 41, and a receiving unit 42, and performs a process similar to that performed by the VM management unit 70 in the control device 40. Processes performed by the detection unit 71, the arrangement table update unit 72, the transmitting unit 41, and the receiving unit 42, and data contained in the VM arrangement table 81 are similar to those in the control device 40 described in the first embodiment.

The flow control device 65 includes an acquisition unit 61, a selection unit 62, flow information 82, flow analysis data 83, a transmitting unit 41, and a receiving unit 42, and performs a process similar to that performed by the flow control unit 60 included in the control device 40. Processes performed by the acquisition unit 61, the selection unit 62, the transmitting unit 41, and the receiving unit 42, and data contained in the flow information 82 and the flow analysis data 83 are similar to those in the control device 40 described in the first embodiment.

In addition, both the flow control device 65 and the VM management device 75 are each implemented by the hardware illustrated in FIG. 3. In the flow control device 65, the acquisition unit 61 and the selection unit 62 are implemented by the processor 101, and the flow analysis data 83 and the flow information 82 are stored in the memory 103. In the VM management device 75, the detection unit 71 and the arrangement table update unit 72 are implemented by the processor 101, and the VM arrangement table 81 is stored in the memory 103. In both of the flow control device 65 and the VM management device 75, the transmitting unit 41 and the receiving unit 42 are implemented by the network interface 104b and the processor 101. Furthermore, in the case where the flow control device 65 and the VM management device 75 do not each perform user data transmission and reception, they do not each have to include the network interface 104a.

Figure 14:
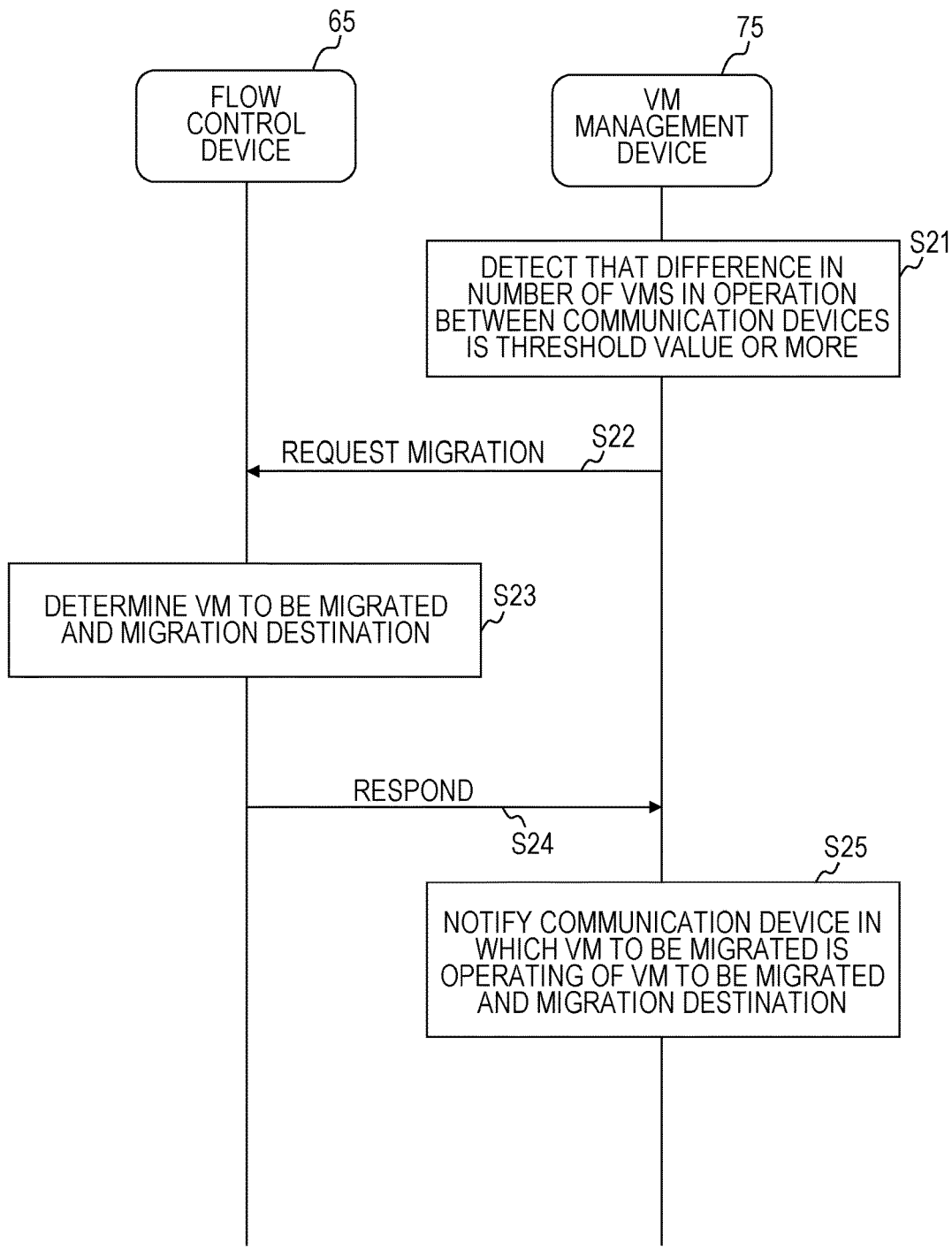
FIG. 14 is a diagram illustrating an example of an operational sequence for communication between a flow control device and a VM management device, according to an embodiment.

FIG. 14 is a diagram illustrating an example of an operational sequence for communication between a flow control device and a VM management device, according to an embodiment. The arrangement table update unit 72 included in the VM management device 75 periodically acquires, from each communication device 10 included in the network, information on virtual machines operating in the communication device 10, and thereby updates the VM arrangement table 81. Then, the detection unit 71 may detect, by using the VM arrangement table 81, that a difference in the number of virtual machines in operation between a plurality of communication devices 10 has become a threshold value Th or more (step S21). Here, as in the first embodiment, it is assumed that a difference in the number of virtual machines in operation between the communication device 10a and the communication device 10c is the threshold value Th or more. Subsequently, the detection unit 71 generates a migration request packet to be transmitted to the flow control device 65.

Figure 15:
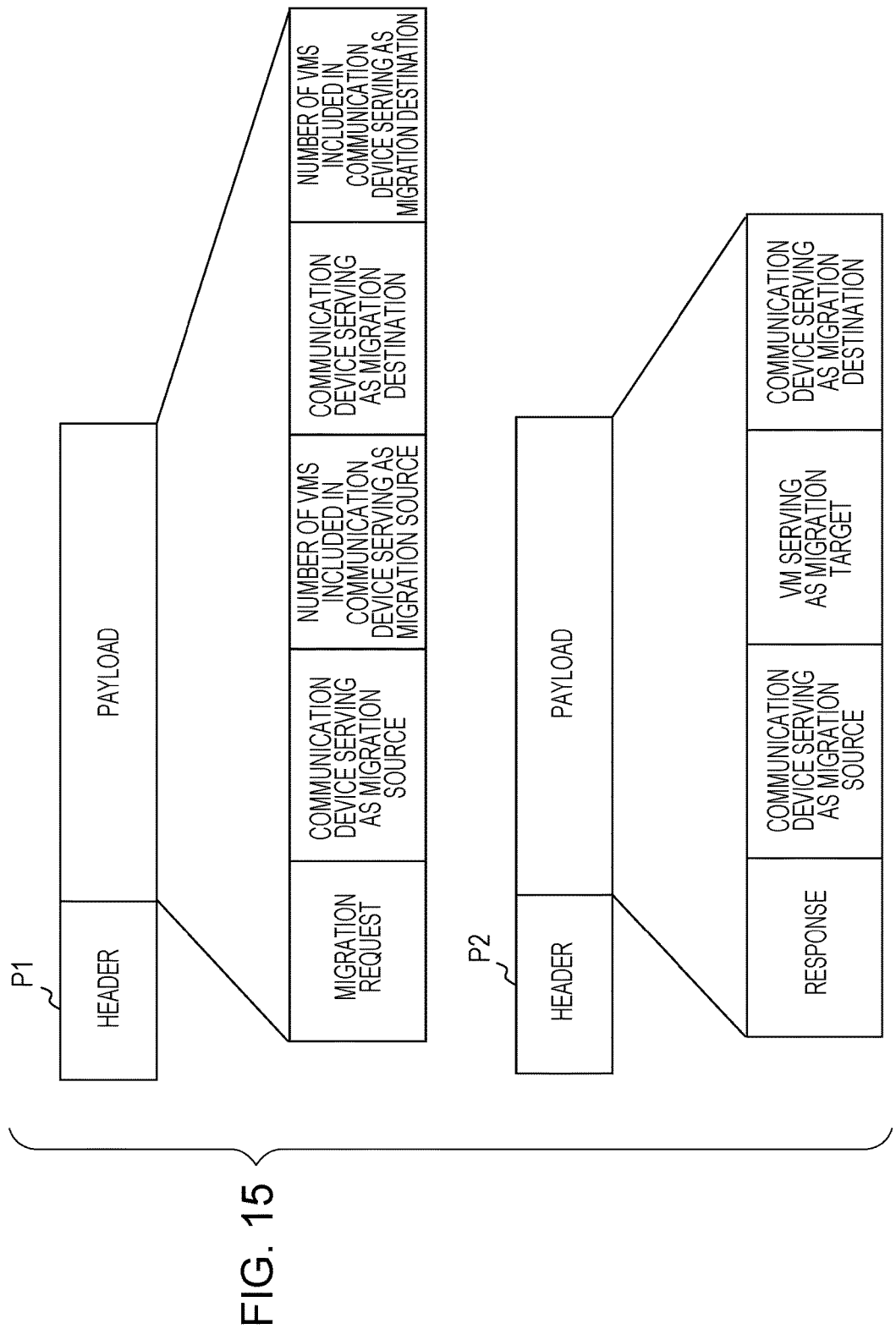
FIG. 15 is a diagram illustrating an example of packets that are transmitted and received between a flow control device and a VM management device, according to an embodiment.

FIG. 15 is a diagram illustrating an example of packets that are transmitted and received between a flow control device and a VM management device, according to an embodiment. As illustrated in a packet P1, the migration request packet has a header and a payload. The payload contains a value representing that the packet is a migration request, identification information of a communication device serving as a migration source, the number of virtual machines included in the communication device serving as a migration source, identification information of a communication device serving as a migration destination, and the number of virtual machines included in the communication device serving as a migration destination. In the case where the virtual machines are arranged as illustrated in FIG. 13, the detection unit 71 generates a migration request packet containing the following information:

Communication Device serving as Migration Source: communication device 10a (Server1);
Number of VMs in operation in Communication Device serving as Migration Source: 3;
Communication Device serving as Migration Destination: communication device 10c (Server3); and
Number of VMs in operation in Communication Device serving as Migration Destination: 1.

The detection unit 71 transmits the migration request packet to the flow control device 65 via the transmitting unit 41 (step S22 in FIG. 14).

The receiving unit 42 of the flow control device 65 outputs the migration request packet to the selection unit 62. The selection unit 62 refers to the flow information 82, and generates the flow analysis data 83 through a process similar to the process described in the first embodiment. In addition, the acquisition unit 61 included in the flow control device 65 periodically acquires, from each communication device 10, flow processing states for each virtual machine, and updates the flow information 82 through a process similar to that in the first embodiment. The selection unit 62 determines, by using the flow analysis data 83, a combination of a virtual machine in which the matching number of flows is largest and a migration destination communication device (step S23 in FIG. 14).

Subsequently, the selection unit 62 generates a response packet to be transmitted to the VM management device 75. A packet P2 in FIG. 15 illustrates an example of the format of the response packet. The response packet has a header and a payload. The payload contains a value representing that the packet is a response packet, identification information of a communication device serving as a migration source, identification information of a virtual machine which is to serve as a migration target, and identification information of a communication device serving as a migration destination. In the case where the virtual machines are arranged as illustrated in FIG. 13, the flow analysis data 83 is as illustrated in FIG. 7, and thus the selection unit 62 generates a response packet containing the following information:
Communication Device serving as Migration Source: communication device 10a (Server1);
VM serving as Migration Target: VM2; and
Communication Device serving as Migration Destination: communication device 10c (Server3).

The selection unit 62 transmits the response packet to the VM management device 75 via the transmitting unit 41 (step S24 in FIG. 14).

The receiving unit 42 of the VM management device 75 outputs the response packet to the arrangement table update unit 72. The arrangement table update unit 72 provides, to the communication device 10a in which the virtual machine to be migrated is operating, a notification that the virtual machine VM2 is to be migrated to the communication device 10c (step S25). In addition, as in the first embodiment, a process performed when the VM management device 75 provides a notification of a virtual machine to be migrated, migration of the virtual machine between the communication devices 10, and so forth are implemented by using any live migration technique.

As in the first embodiment, in the second embodiment as well, a virtual machine serving as a migration target is determined by using comparisons of the types of flows being processed by virtual machines and the types of flows being processed in a communication device 10 serving as a migration destination of the virtual machine. This may keep a processing load from increasing due to an increase in the number of flows in the communication device 10 serving as the migration destination of the virtual machine as in the first embodiment.

<Others>

Note that the embodiments are not limited to the above description, and various modifications may be made. Some examples will be described below.

The tables and packet formats given in the above description are each an example, and the information elements contained in the tables and packets may be changed in accordance with implementations.

In the second embodiment, although the case where the VM management device 75 notifies a communication device 10 of a virtual machine to be migrated and a migration destination of the virtual machine has been described as an example, a modification may be made so that the flow control device 65 notifies the communication device 10 of these pieces of information.

A control packet for migrating a virtual machine may be transmitted to both of a communication device in which the virtual machine serving as a migration target is operating and a communication device serving as a migration destination of the virtual machine. In addition, a control packet may be designed so as to be transmitted to a communication device in which a virtual machine serving as a migration target is operating.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A control device for controlling migration of a plurality of virtual machines between a plurality of servers in a communication network, the control device comprising:
 a processor configured:
  to acquire flow information that corresponds to a plurality of flows for the plurality of virtual machines, the plurality of flows comprising communications between at least one of the plurality of servers and another device other than the plurality of servers,
  to select, based on the acquired flow information, a virtual machine migration target among the plurality of virtual machines to be migrated from a migration source server of the plurality of servers to a migration destination server of the plurality of servers, wherein the selecting of the virtual machine migration target is based on:
   a first number of virtual machines among the plurality of virtual machines in operation on the migration source server being relatively large as compared to the other servers among the plurality of servers,
   a second number of virtual machines among the plurality of virtual machines in operation on the migration destination server being relatively small as compared to the other servers among the plurality of servers,
   a number of matching flows between the virtual machine migration target and the migration destination server, the number of matching flows indicating how many flows of both the virtual machine migration target and the migration destination server have a same destination address, and minimizing, based on the acquired flow information, a resultant number of the plurality of flows between the plurality of servers and the another device other than the plurality of servers with which the plurality of servers are communicating, and to transmit a control packet for migrating the migration target virtual machine to the migration destination server; and a memory coupled to the processor, configured to store the flow information.

2. The control device of claim 1, wherein, in a case where there are a plurality of candidates for the migration destination server, the processor:

calculates, for each of the plurality of candidates, a flow-matching number with respect to each of the virtual machines in operation in the migration source server, selects, among combinations of a virtual machine selected from the virtual machines in operation in the migration source server and a server selected from the plurality of candidates, a combination having the larger flow-matching number on a priority basis, selects a server contained in the selected combination as the migration destination server, and selects a virtual machine contained in the selected combination as the migration target.

3. The control device of claim 1, wherein the processor detects that a difference in a number of virtual machines in operation between the migration source server and a server whose number of virtual machines in operation is relatively small among the plurality of servers reaches a threshold value.

4. The control device of claim 1, wherein the processor:

receives, from a management device that manages an arrangement of virtual machines included in the plurality of servers, a request packet that includes a request for selection of the virtual machine migration target, identification information of the migration source server, and identification information of a server whose number of virtual machines in operation is smaller than that in the migration source server by a threshold value or more;

selects the virtual machine migration target by using the request packet; and transmits the control packet to the migration source server via the management device.

5. A communication device serving as any one of a plurality of servers in a communication network, each server being configured to operate a plurality of virtual machines, the communication device comprising:

a processor configured:

to classify, for each of virtual machines in operation in the communication device as a migration source server, flow information that corresponds to a plurality of flows for the plurality of virtual machines, the plurality of flows comprising communications between at least one of the plurality of servers and another device other than the plurality of servers, to transmit the classified results to a control device that controls migration of a virtual machine between the plurality of servers, to receive, from the control device, a control packet containing an identifier of a migration target and an identifier of a migration destination server whose number of virtual machines in operation is smaller than that of the migration source server, the migration target being a virtual machine whose matching number of flows, of the plurality of flows, is relatively large, the matching number of flows indicating a number of flows, of the plurality of flows, that have a same destination address and are currently processed by both the virtual machine as the migration target and the migration destination server as a migration destination, the migration target having been selected to minimize a resultant number of the plurality of flows between the plurality of servers and the another device other than the plurality of servers with which the plurality of servers are communicating, and to perform a process for migrating the migration target to the migration destination server; and a memory coupled to the processor, configured to store the classified results.

6. A method for controlling migration of a plurality of virtual machines between a plurality of servers in a communication network, the method comprising:

acquiring flow information that corresponds to a plurality of flows for a the plurality of virtual machines, the plurality of flows comprising communications between at least one of the plurality of servers and another device other than the plurality of servers;

selecting, based on the acquired flow information, a virtual machine migration target among the plurality of virtual machines to be migrated from a migration source server of the plurality of servers to a migration destination server of the plurality of servers, wherein the selecting of the virtual machine migration target is based on:

a first number of virtual machines among the plurality of virtual machines in operation on the migration source server being relatively large as compared to the other servers among the plurality of servers, a second number of virtual machines among the plurality of virtual machines in operation on the migration destination server being relatively small as compared to the other servers among the plurality of servers, and a number of matching flows between the virtual machine migration target and the migration destination server, the number of matching flows indicating how many flows of both the virtual machine migration target and the migration destination server have a same destination address, and minimizing, based on the acquired flow information, a resultant number of the plurality of flows between the plurality of servers and the another device other than the plurality of servers with which the plurality of servers are communicating; and transmitting a control packet for migrating the migration target virtual machine to the second server.

* * * * *